(12) United States Patent
Kazama et al.

(10) Patent No.: US 11,892,745 B2
(45) Date of Patent: Feb. 6, 2024

(54) WAVELENGTH CONVERSION ELEMENT AND METHOD FOR MANUFACTURING SAME

(71) Applicant: Nippon Telegraph and Telephone Corporation, Tokyo (JP)

(72) Inventors: Takushi Kazama, Musashino (JP); Takahiro Kashiwazaki, Musashino (JP); Osamu Tadanaga, Musashino (JP); Koji Embutsu, Musashino (JP); Ryoichi Kasahara, Musashino (JP); Takeshi Umeki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 345 days.

(21) Appl. No.: 17/294,320

(22) PCT Filed: Nov. 13, 2019

(86) PCT No.: PCT/JP2019/044514
§ 371 (c)(1),
(2) Date: May 14, 2021

(87) PCT Pub. No.: WO2020/100937
PCT Pub. Date: May 22, 2020

(65) Prior Publication Data
US 2022/0019125 A1    Jan. 20, 2022

(30) Foreign Application Priority Data

Nov. 16, 2018 (JP) .................................. 2018-215578

(51) Int. Cl.
*G02F 1/377*     (2006.01)
*G02F 1/355*     (2006.01)
(Continued)

(52) U.S. Cl.
CPC ............. *G02F 1/3775* (2013.01); *G02B 6/12* (2013.01); *G02B 6/13* (2013.01); *G02F 1/3551* (2013.01);
(Continued)

(58) Field of Classification Search
CPC . G02B 6/12; G02B 6/124; G02B 6/13; G02B 6/136; G02F 1/3551; G02F 1/377; G02F 1/3775; G02F 1/39; G02F 2202/20
See application file for complete search history.

(56) References Cited

U.S. PATENT DOCUMENTS 5,285,508 A  *  2/1994  Chikuma  ..............  G02F 1/3775
                                                  385/37
11,442,225 B2 *  9/2022  Kashiwazaki  ...........  G02B 6/13
(Continued)

FOREIGN PATENT DOCUMENTS

JP        2014211539 A  *  11/2014  .............  G02F 1/377

OTHER PUBLICATIONS

Y. Nishida et al., Direct-Bonded QPM-LN Ridge Waveguide with High Damage Resistance at Room Temperature, Electronics Letters, vol. 39, No. 7, Apr. 3, 2003, pp. 609-611.
(Continued)

*Primary Examiner* — Daniel Petkovsek
(74) *Attorney, Agent, or Firm* — Workman Nydegger (57) ABSTRACT

With a wavelength conversion device based on a nonlinear optical effect, when arrayed waveguides including an intended nonlinear waveguide are fabricated, unwanted slab waveguides are inevitably formed. The slab waveguides can cause an erroneous measurement in the selection of a waveguide having desired characteristics from the arrayed waveguides. The erroneous measurement can lead to redoing steps for fabricating the wavelength conversion device and a decrease in the yield and inhibit the evaluation of the
(Continued)

characteristics in selection of the waveguide and the subsequent fabrication of the wavelength conversion device from being efficiently performed. A wavelength conversion device according to the present invention includes a plurality of waveguides formed on a substrate, and a plurality of slab waveguides that are arranged substantially in parallel with and spaced apart from the plurality of waveguides, and each of the slab waveguides has a grating structure that reflects light of a particular wavelength.

8 Claims, 7 Drawing Sheets

(51) Int. Cl.
  *G02B 6/12* (2006.01)
  *G02B 6/13* (2006.01)
  *G02B 6/124* (2006.01)
  *G02B 6/136* (2006.01)
  *G02F 1/39* (2006.01)

(52) U.S. Cl.
  CPC .............. *G02F 1/377* (2013.01); *G02B 6/124* (2013.01); *G02B 6/136* (2013.01); *G02F 1/39* (2013.01); *G02F 2202/20* (2013.01)

(56) References Cited

U.S. PATENT DOCUMENTS

2005/0191055 A1* 9/2005 Maruyama ......... G02B 6/12023
 398/45
2019/0227350 A1* 7/2019 Puckett ................ H04B 10/548

OTHER PUBLICATIONS

Takeshi Umeki et al., Highly Efficient Wavelength Converter Using Direct-Bonded PPZnLN Ridge Waveguide, IEEE Journal of Quantum Electronics, vol. 46, No. 8, Aug. 2010, pp. 1206-1213.
Takushi Kazama et al., Low-Parametric-Crosstalk Phase-Sensitive Amplifier for Guard-Band-Less DWDM Signal Using PPLN Waveguides, Journal of Lightwave Technology, vol. 35, No. 4, Feb. 15, 2017, pp. 755-761.

* cited by examiner

Fig. 1

PRIOR ART

WAVELENGTH CONVERSION ELEMENT AND METHOD FOR MANUFACTURING SAME

TECHNICAL FIELD

The present invention relates to an optical device based on a nonlinear optical effect. More specifically, the present invention relates to a wavelength conversion device used for an optical communication system or optical measurement system.

BACKGROUND ART

Optical application technologies based on nonlinear optical effects are expected to find uses in fields such as optical communication or optical quantum information communication. A basic nonlinear optical effect is wavelength conversion, which converts light incident on a nonlinear optical medium into light of a different frequency. More specifically, a technique is widely known which uses the characteristics of the wavelength conversion to generate light in a wavelength band that is hardly oscillated by a laser by itself. In particular, a periodically poled lithium niobate (PPLN) waveguide made of lithium niobate (LiNbO$_3$), which is a second-order nonlinear material and has a high nonlinear constant, provides a highly efficient nonlinear optical effect and has already been incorporated in commercially available light sources.

The second-order nonlinear optical effect generates light of a new wavelength $\lambda_3$ from input light of wavelengths $\lambda_1$ and $\lambda_2$. The wavelength conversion satisfying the following formula is referred to as sum frequency generation (SFG).

$$1/\lambda_3 = 1/\lambda_1 + 1/\lambda_2 \quad \text{Formula (1)}$$

If $\lambda_1 = \lambda_2$, the Formula (1) can be transformed into the following formula, and the wavelength conversion satisfying the following formula is referred to as second harmonic generation (SHG).

$$\lambda_3 = \lambda_1/2 \quad \text{Formula (2)}$$

Furthermore, the wavelength conversion satisfying the following formula is referred to as difference frequency generation (DFG).

$$1/\lambda_3 = 1/\lambda_1 - 1/\lambda_2 \quad \text{Formula (3)}$$

Furthermore, there is also an optical parametric effect that generates light of the wavelengths $\lambda_2$ and $\lambda_3$ that satisfy the Formula (3) from input light of the wavelength $\lambda_1$. The SHG and SFG wavelength conversions described above generate light of a shorter wavelength, that is, light of a higher energy, from input light and is often used for generation of light in the visible light range, for example.

In order to efficiently achieve the second-order nonlinear optical effect described above, it is necessary that the phase mismatch between the three rays of light of different wavelengths interacting with each other is 0. With the periodically poled waveguide, the poles of the second-order nonlinear optical material can be periodically inverted to achieve a quasi-phase matching. Provided that the inversion period is $\Lambda$, in the sum frequency generation expressed by the Formula (1), the inversion period $\Lambda$ can be set to satisfy the following formula with respect to the wavelengths $\lambda_1$, $\lambda_2$ and $\lambda_3$.

$$n_3/\lambda_3 - n_2/\lambda_2 - n_1/\lambda_1 - 1/\Lambda = 0 \quad \text{Formula (4)}$$

In this formula, $n_1$ denotes the index of refraction at the wavelength $\lambda_1$, $n_2$ denotes the index of refraction at the wavelength $\lambda_2$, and $n_3$ denotes the index of refraction at the wavelength $\lambda_3$.

In addition to using such a periodically poled structure, the region in which the wavelength conversion occurs can be formed as a waveguide to achieve highly efficient wavelength conversion. The nonlinear optical effect grows as the overlapping density of the light that causes the nonlinear interaction increases. More efficient wavelength conversion can be achieved by using a waveguide structure, which can confine the light in a small cross-sectional area and guide the light over a long distance.

Typical methods for achieving a waveguide structure made of lithium niobate (LN), which is a nonlinear optical crystal, are based on Ti diffusion or proton exchange. Recently, as described in Non-Patent Literature 1, ridge optical waveguides as a wavelength conversion device are being researched and developed. The ridge optical waveguide can directly use the characteristics of the bulk crystal and is characterized by its high optical damage resistance, its long-term reliability and its ease of device designing, for example. The ridge optical waveguide is formed by bonding two substrates to each other, thinning one of the substrates into a thin film and forming ridges in the thinned substrate. To bond the two substrates described above, a direct bonding technique of firmly bonding the substrates without using an adhesive or the like is used. The directly-bonded ridge waveguide can be used with intense incident light and has been successfully reduced in size of the core thereof owing to the progress of the waveguide forming techniques (Non-Patent Literature 2, for example), and the nonlinear optical efficiency of the directly-bonded ridge waveguide is ever improving.

LN, which is a ferroelectric crystal, is a material that is hard to process, and it is difficult to form an LN structure sized or shaped as designed even if a semiconductor process capable of fine processing is used. In addition, the nonlinear optical effect in the PPLN waveguide using the quasi-phase matching is sensitive to the structure of the waveguide. In the state of the art, therefore, it is difficult to fabricate a nonlinear optical waveguide having desired nonlinear optical characteristics as designed. For this reason, as described later, a plurality of waveguides between which a structure parameter gradually varies is formed on a substrate at the same time, the optical characteristics of all the waveguides are evaluated, and only the waveguide(s) having desired characteristics is selected and used.

In the shaping of the PPLN waveguide, the dry etching technique is more often used than the wet etching technique. With the wet etching, the etching rate significantly varies in the direction of the polarization of the PPLN, and it is difficult to obtain a desired waveguide structure. After a plurality of waveguides is formed on a bonded substrate, the substrate is cut to form an end face for measurement, and a waveguide having desired characteristics is selected. After that, the wavelength conversion device including the selected waveguide is packaged into a module as a fiber-pigtailed device, for example (Non-Patent Literature 3). When packaging into a module, the selected waveguide is aligned with optical fibers via a lens so that light is efficiently incident on the waveguide and converted light is efficiently emitted from the waveguide. The series of steps for fabricating the wavelength conversion device using the PPLN waveguide described above will be described later with reference to FIG. 2.

CITATION LIST

Non-Patent Literature

Non-Patent Literature 1: Y. Nishida, H. Miyazawa, M. Asobe, O. Tadanaga, and H. Suzuki, "Direct-bonded QPM-LN ridge waveguide with high damage resistance at room temperature", 2003 Electronics Letters, Vol. 39, No. 7, p. 609-611

Non-Patent Literature 2: T. Umeki, O. Tadanaga, and M. Asobe, "Highly Efficient Wavelength Converter Using Direct-Bonded PPZnLN Ridge Waveguide", 2010 IEEE Journal of Quantum Electronics, Vol. 46, No. 8, pp. 1206-1213

Non-Patent Literature 3: T. Kazama, T. Umeki, M. Abe, K. Enbutsu, Y. Miyamoto, and H. Takenouchi, "Low-Parametric-Crosstalk Phase-Sensitive Amplifier for Guard-Band-Less DWDM Signal Using PPLN Waveguides", 2017 Journal of Lightwave Technology, Vol. 35, Issue 4, pp. 755-761

SUMMARY OF THE INVENTION

Technical Problem

In the fine processing of a nonlinear optical crystal, there is a known problem that a common chemical dry etching causes generation of a low-volatility substance, which inhibits efficient etching. To avoid the problem, as wide a portion of the part that does not need to be etched as possible needs to be covered with an etching mask, such as a resist, that is an organic protective film. However, if an etching mask is used in the waveguide fabrication process, an unwanted slab waveguide is inevitably formed outside the desired waveguide structure.

Figure 1:
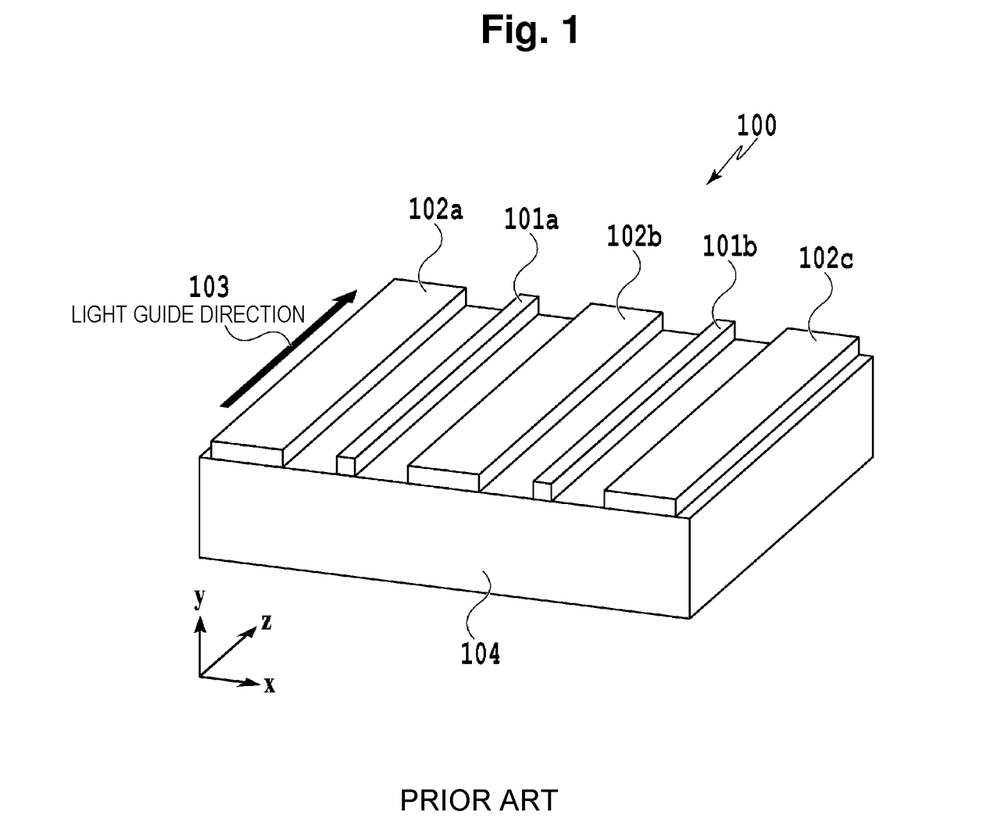
FIG. 1 is a diagram showing a configuration of a conventional wavelength conversion device made of PPLN.

FIG. 1 is a diagram showing a configuration of a conventional wavelength conversion device using PPLN waveguides. As described above, when fabricating an optical waveguide device using LN, arrayed waveguides between which a waveguide structure parameter gradually varies are fabricated, from the viewpoint that the material is difficult to process and the yield tends to be low. From the plurality of waveguides forming the waveguide array, only the waveguide having the most excellent optical characteristics is selected and used. FIG. 1 is a conceptual diagram showing a wavelength conversion device chip 100 including a plurality of waveguides 101a and 101b fabricated on a substrate 104.

Figure 2:
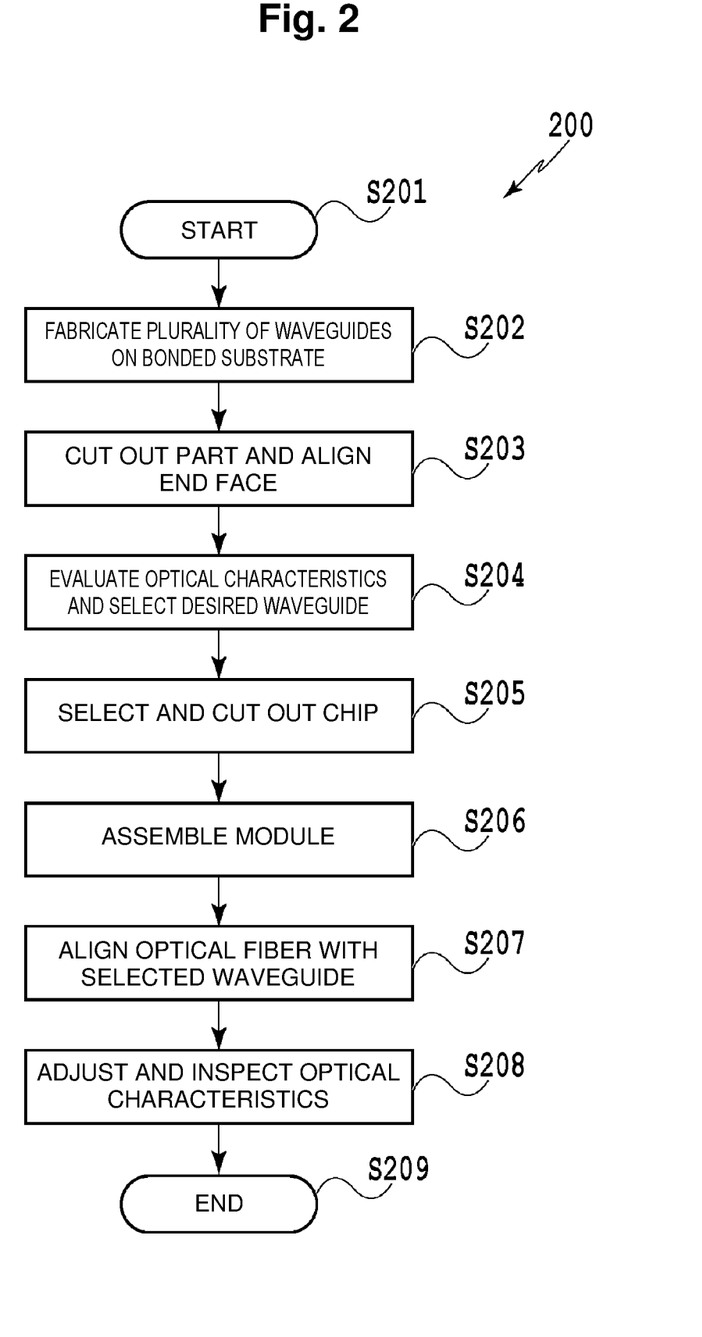
FIG. 2 is a flow diagram for illustrating a fabrication of a wavelength conversion device incorporating PPLN waveguides.

FIG. 2 is a flow diagram showing a series of steps for fabricating a wavelength conversion device using PPLN waveguides. Referring to a flow 200, first, in Step 202, the plurality of waveguides 101a and 101b is fabricated on a bonded substrate. The wavelength conversion device chip 100 in FIG. 1 corresponds to the chip including part of the plurality of waveguides fabricated on the substrate that is cut out in Step 203 in FIG. 2. Once the wavelength conversion device chip 100 shown in FIG. 1 is fabricated, in Step 204 in the flow diagram of FIG. 2, the optical characteristics of each of the plurality of waveguides 101a and 101b as a wavelength conversion waveguide are measured, and a desired wavelength is selected.

Referring to FIG. 1 again, slab waveguides 102a, 102b and 102c are formed in the portion covered with the etching mask in order to efficiently form the waveguides 101a and 101b by etching. If there are these slab waveguides, when the optical characteristics of the arrayed waveguides are measured in Step 204 in FIG. 2, the slab waveguides that are not the arrayed waveguides including the desired waveguide finally selected can also be optically aligned on the end face of the wavelength conversion device chip 100 for the measurement of the optical characteristics. The unwanted slab waveguides formed in addition to the arrayed waveguides pose problems that hinder the efficient waveguide selection and the subsequent manufacture and inspection of the module, such as problems that the measurement is erroneous, that the measurement needs to be redone, and that a wrong waveguide is selected and the chip has to be discarded, in the evaluation of the characteristics of the arrayed waveguides. The problems will be described in more detail below with reference to an actual process of fabricating a wavelength conversion device.

Figure 3A:
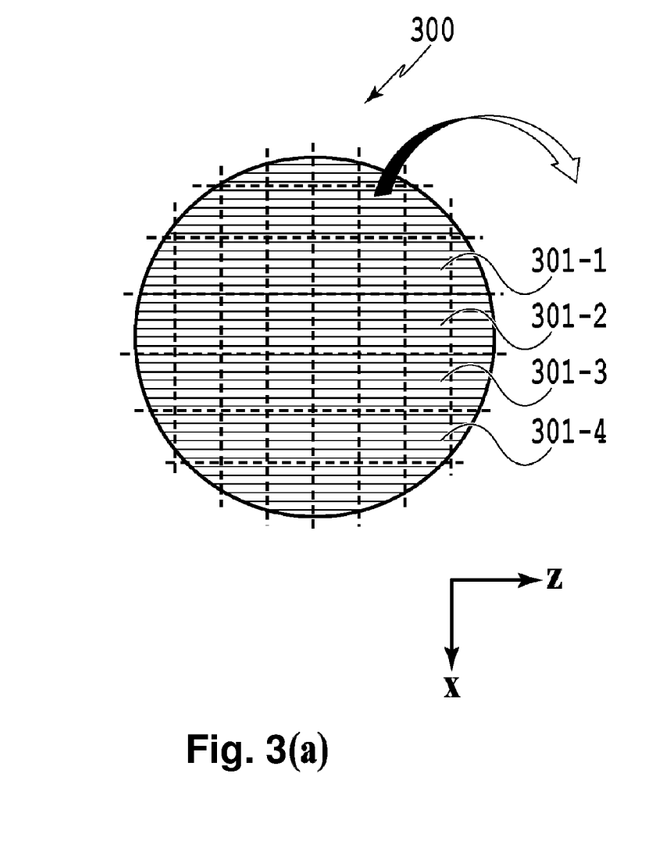
FIGS. 3(a) and 3(b) are diagrams for illustrating a step of selecting a waveguide from a waveguide array.
Figure 3B:
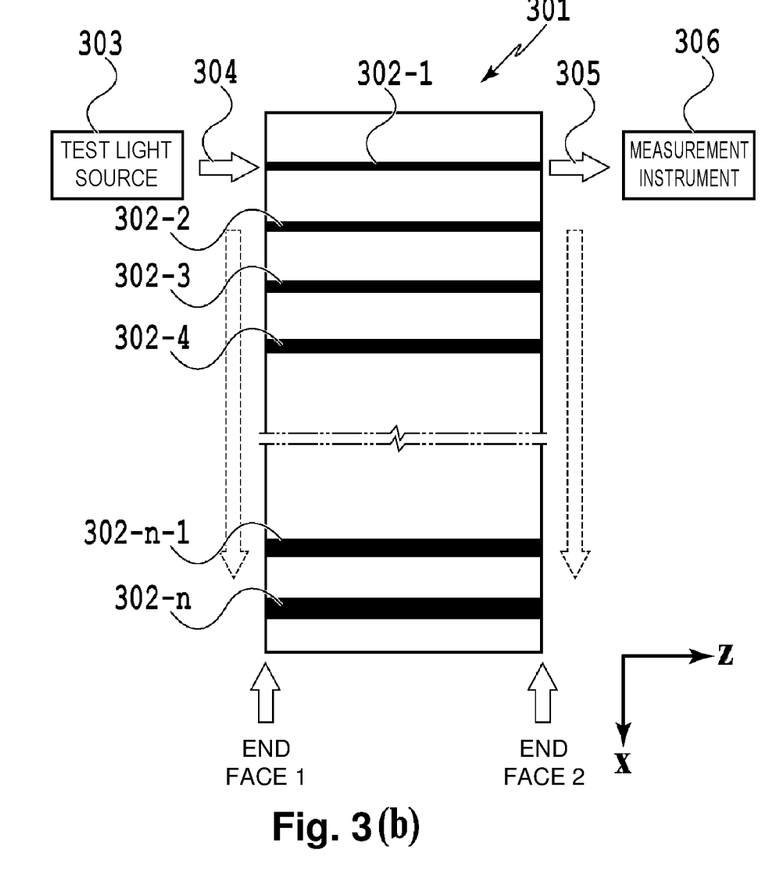

FIG. 3 are diagrams for conceptually illustrating the step of selecting a desired waveguide from a waveguide array. As shown in FIG. 3(a), the wavelength conversion device chip 100 shown in FIG. 1 is typically obtained by fabricating a waveguide array including 100 or more waveguides on the entire face of a directly-bonded wafer 300 (Step 202) and cutting chips having areas 301-1 to 301-4 of a predetermined size out of the wafer 300 (Step 203). Note that the chip cutting is performed for the evaluation of the optical characteristics and the waveguide selection in Step 204, and the areas 301-1 to 301-4 in FIG. 3(a) are larger than the final chip area. In Step 204, one waveguide having the most excellent optical characteristics is selected from a plurality of waveguides between which a structure parameter gradually varies. Therefore, the cutting in a direction (x-axis) perpendicular to the waveguides in FIG. 3(a) is performed in minimum units of final wavelength conversion devices. On the other hand, the cutting in a direction (z-axis) parallel with the waveguides in FIG. 3(a) in Step 203 is performed in appropriate units of a plurality of chips of a final size by considering the number of the arrayed waveguides included in a group for selection in order that the optical characteristics can be efficiently evaluated.

FIG. 3(b) is a diagram for conceptually illustrating a chip 301 cut out for the measurement of the optical characteristics. The chip 301 cut out for the measurement of the optical characteristics intrinsically includes n waveguides 302-1 to 302-n having different widths, for example. The number of the waveguides included in the chip 301 may be greater than 100. The optical characteristics of the waveguides are successively measured between one end face 1 and another end face 2 of the chip 301. Specifically, one or more kinds of test light 304 are launched from a test light source 303 into the end face 1 via an optical fiber, and the test light or wavelength-converted light 305 output from the end face 2 is measured by a measurement instrument 306. In the optical measurement of the waveguides, instead of measuring the loss of the guided light, the wavelength conversion characteristics may be directly checked by using two or more rays of signal light from a single-wavelength light source, a wide-band light source and the like.

In practice, as described above, in addition to the large number of arrayed waveguides 302-1 to 302-n including the waveguide finally selected, the chip 301 cut out shown in FIG. 3(b) includes unwanted slab waveguides (not shown in FIG. 3) between the arrayed waveguides. The arrayed waveguides that can be selected are waveguides having an extremely small cross-sectional area, such as about several μm square, while the slab waveguides have a far greater width of several tens of μm or more. Therefore, when the optical fiber is brought close to each end face for measuring the optical characteristics, the optical fiber can be readily optically coupled to the large number of slab waveguides, which are not the target of the evaluation of the optical characteristics. Typically, when optically coupling the optical fiber to the chip end face for the evaluation of the optical characteristics, the position of the optical coupling is successively displaced in the direction of arrangement of the arrayed waveguides (x-axis) for the optical measurement. However, the slab waveguides occupy a considerable proportion of the chip end face in the x-axis direction, so that the optical fiber can be optically coupled to not only the target waveguides but also the slab waveguides to a similar extent over a wide range while the point of measurement is being moved in the x-axis direction. Even if a three-dimensional drive mechanism capable of extremely precise adjustment is used, the optical measurement can be performed at a wrong point. The resulting erroneous measurement obtained from the slab waveguides can lead to an erroneous selection of the waveguide having the best optical characteristics.

If the measurement is erroneous, a waveguide having inappropriate wavelength conversion characteristics, which should not be intrinsically selected, can be selected in Step 204 in FIG. 2. Furthermore, when a chip of the minimum size including a set of arrayed waveguides is cut out in the subsequent Step 205, a chip including an inappropriate waveguide can be formed, or a chip including the optimum waveguide can fail to be selected but be discarded. Furthermore, the measurement of each waveguide shown in FIG. 3 typically takes about 2 minutes, so that the measurement of 100 waveguides takes more than 3 hours, for example. If an erroneous optical measurement occurs at the stage of selecting the desired waveguide, it takes a vast amount of time and an additional cost to remedy the error and redo the measurement. The manufacture yield also decreases in all the steps in which the wavelength conversion device module is completed through the series of steps in FIG. 2. For this reason, performing the evaluation of the optical characteristics of the target arrayed waveguides without error in Step 204 in the flow diagram of FIG. 2 is a key to efficiently performing the series of steps for fabricating the wavelength conversion device in FIG. 2. The plurality of slab waveguides formed between the plurality of intrinsically required waveguides shown in FIG. 1 hinder the evaluation of the characteristics of the waveguides and the subsequent fabrication of the wavelength conversion device from being efficiently performed.

The present invention has been devised in view of such problems, and an object of the present invention is to provide a configuration for more efficiently fabricating a wavelength conversion device incorporating a nonlinear optical device.

Means for Solving the Problem

To attain the object described above, an invention according to claim 1 is a wavelength conversion device, including: a plurality of waveguides formed on a substrate of a nonlinear material; and a plurality of slab waveguides that are arranged substantially in parallel with and spaced apart from the plurality of waveguides, each of the plurality of slab waveguides having a grating structure in which an index of refraction periodically varies in a length direction of the waveguide.

An invention according to claim 2 is the wavelength conversion device according to claim 1, wherein each of the grating structures of the plurality of slab waveguides has a different period and reflects light of a particular wavelength corresponding to the different period.

An invention according to claim 3 is the wavelength conversion device according to claim 1 or 2, wherein each of the plurality of slab waveguides has a width or thickness that periodically varies in the length direction of the waveguide.

An invention according to claim 4 is the wavelength conversion device according to claim 1 or 2, wherein each of the plurality of slab waveguides includes structures of a material having an index of refraction greater than 1 periodically arranged in the length direction of the waveguide.

An invention according to claim 5 is the wavelength conversion device according to any one of claims 1 to 4, wherein the plurality of waveguides and the plurality of slab waveguides are straight waveguides, and a configuration parameter that determines a size of a core of each of the plurality of waveguides gradually varies between the plurality of waveguides.

An invention according to claim 6 is the wavelength conversion device according to any one of claims 1 to 4, wherein the plurality of waveguides is made of $LiNbO_3$ or a material containing $LiNbO_3$ and at least one additive selected from among Mg, Zn, Sc and In.

An invention according to claim 7 is a method of fabricating a wavelength conversion device, the wavelength conversion device including a plurality of waveguides formed on a substrate of a nonlinear material and a plurality of slab waveguides that are arranged substantially in parallel with and spaced apart from the plurality of waveguides, the method including: a step of fabricating, in each of the plurality of slab waveguides, a grating structure in which an index of refraction periodically varies in a length direction of the waveguide; a step of selecting a waveguide having a desired optical characteristic by successively measuring an optical characteristic of the plurality of waveguides while detecting reflected wave of a wavelength corresponding to a period of the grating structure; and a step of optically coupling the selected waveguide and an optical fiber to each other based on the reflected wave from at least one slab waveguide that is adjacent to the selected waveguide on one side of the selected waveguide.

An invention according to claim 8 is the method according to claim 7, wherein each of the grating structures of the plurality of slab waveguides has a different period, and the step of optical coupling includes: a first optical coupling step of roughly optically coupling the at least one slab waveguide adjacent to the selected waveguide and the optical fiber to each other based on reflected waves of particular wavelengths corresponding to the different periods; and a second optical coupling step of precisely optically coupling the optical fiber and the selected waveguide to each other.

Effects of the Invention

According to the present invention, a wavelength conversion device using a nonlinear optical element can be efficiently fabricated.

DESCRIPTION OF EMBODIMENTS

A wavelength conversion device according to the present invention includes a plurality of waveguides formed on a substrate and a plurality of slab waveguides that are arranged substantially in parallel with and spaced apart from the plurality of waveguides. Each of the slab waveguides has a structure in which the same shape is periodically repeated, that is, a grating structure. A waveguide has an effective index of refraction of light that varies depending on the structure of the waveguide. Therefore, the periodic variation of the shape of the waveguide can provide a periodic variation of the index of refraction. When light is incident on such a grating structure, the grating structure provides reflected light (return light) of a particular wavelength determined by the period of the grating and the index of refraction of the waveguide that has not been transmitted through the waveguide.

An implementer efficiently selects a waveguide having desired optical characteristics from among a plurality of waveguides by configuring the grating of each of the slab waveguides so as to produce reflected light of a different wavelength. In the process of fabricating the wavelength conversion device, the period of the grating structure of each of the slab waveguides can be made to vary. The slab waveguides that produce reflected light of different wavelengths are used for optically coupling a selected wavelength in a chip cut out from a substrate to an external fiber or the like in a module. By checking the presence or absence or the wavelength of the reflected light from the grating, the implementer can easily efficiently perform an alignment of the optical coupling between the selected waveguide and the optical fiber and efficiently fabricate a wavelength conversion device at low cost.

First Embodiment

Figure 4:
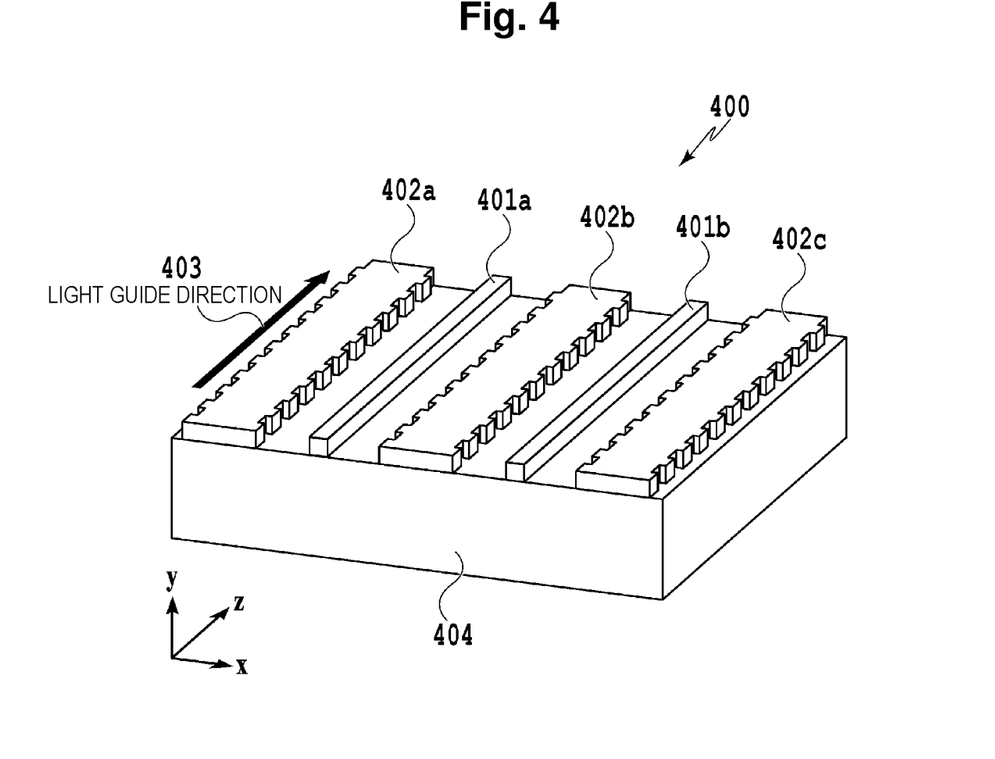
FIG. 4 is a conceptual diagram for illustrating a configuration of a wavelength conversion device according to a first embodiment of the present invention.

FIG. 4 is a conceptual diagram for illustrating a configuration of a wavelength conversion device according to a first embodiment of the present invention. The configuration of the wavelength conversion device according to the present invention corresponds to the configuration of the conventional wavelength conversion device chip 100 shown in FIG. 1. A wavelength conversion device 400 in FIG. 4 is a chip including a plurality of waveguides cut from a substrate (wafer) in which a large number of waveguides (arrayed waveguides) is formed. The wavelength conversion device 400 includes a plurality of waveguides 401a and 401b and slab waveguides 402a to 402c that are formed substantially in parallel with and spaced apart from the plurality of waveguides. All the waveguides are formed along a z-axis direction, and light can be input to and output from the wavelength conversion device 400 at two chip end faces (x-y faces) that are perpendicular to the waveguides (z-axis) and oriented in the depth direction of the drawing. Light input to one end face is guided to the other end face in each waveguide in the light guide direction (z-axis).

With the wavelength conversion device according to the present invention, a plurality of waveguides between which a configuration parameter gradually varies is formed in one chip, and the most appropriate waveguide can be selected from among the plurality of waveguides. The configuration parameter that varies between the waveguides may be a parameter that determines the shape of the waveguide. For example, the waveguide width may gradually vary. Alternatively, the polarization inversion period (QPM pitch) may vary. Depending on the application or purpose of the wavelength conversion device, the most appropriate waveguide can be selected by measuring the propagation loss of each of the plurality of waveguides and selecting the waveguide of the lowest propagation loss, for example. Alternatively, two optical signals of different wavelengths may be input to one of the end faces of the chip, the level of the light of converted wavelengths emitted from the other end face may be measured, and the waveguide of the highest wavelength conversion efficiency may be selected. The selection of the most appropriate waveguide can be based on any criterion including the measurement described above. That is, the configuration and concept according to the present invention can be used when fabricating arrayed waveguides and selecting one or more of the waveguides based on some criterion in order to attain an intended functionality. Note that, therefore, the present invention also has an aspect as a method of selecting a waveguide.

The slab waveguides 402a to 402c of the wavelength conversion device according to the present invention described in FIG. 4 are formed at the same time in a region that is covered with an etching mask when the plurality of waveguides between which a configuration parameter gradually varies described above is fabricated by fine processing by dry etching. With the wavelength conversion device according to the present invention, each of the slab waveguides 402a to 402c has a grating structure in which different waveguide widths periodically occur. The test light input to the slab waveguides 402a to 402c at one end face of the chip is strongly reflected only at a particular wavelength that is determined by the period of the grating and the index of refraction of the slab waveguides. Therefore, reflected light (return light) of the particular wavelength is output from the end face to which the test light is input, and the test light excluding the component of the wavelength of the reflected light is output from the other end face.

In the wavelength conversion device according to the present invention, the plurality of waveguides 401a and 401b and the slab waveguides 402a to 402c adjacent thereto are spaced apart from each other to an extent that the slab waveguides have no influence on the nonlinear waveguides serving as the wavelength conversion device, that is, the waveguides 401a and 401b. For example, if the waveguide has a ridge structure in which the plurality of waveguides 401a and 401b are LN cores and there is air on the opposite sides of the cores, the distance between the waveguides and the slab waveguides can be approximately equal to or greater than the wavelength of the guided light. The interval (period) between the plurality of waveguides (in the x-axis direction) can be several tens of μm to several hundreds of μm for the wavelength conversion device for optical communication, for example, although the interval can depend on the application.

As described earlier with reference to FIGS. 2 and 3, in the series of steps for fabricating the wavelength conversion device, the plurality of waveguides 401*a* and 401*b* and the slab waveguides 402*a* to 420*c* are fabricated (Step 202). After that, as shown in FIG. 3(*b*), the chip 301 including a large number of waveguides and slab waveguides arranged in parallel with each other is cut out (Step 203). Note that the selection from among the waveguides is yet to be made at this point, and the chip is a so-called half-finished chip and includes a large number of waveguides, specifically, several tens to over a hundred of waveguides. After this step, the step (Step 204) of evaluating the optical characteristics and selecting one appropriate waveguide (desired waveguide) from among the large number of waveguides (waveguide array) is performed for the wavelength conversion device 400 shown in FIG. 4. Specifically, the optical characteristics of all the waveguides in FIG. 4 are measured by successively displacing the position of coupling to an optical fiber in the x-axis direction on each of the two end faces of the wavelength conversion device shown in FIG. 4.

With the conventional configuration, the optical fiber can also be optically coupled to the slab waveguides, which should not be intrinsically selected. Therefore, the measurement in Step 204 in FIG. 2 is erroneous, so that some of the steps for fabricating the wavelength conversion device need to be redone and therefore problems such as a reduction of the efficiency, a reduction of the yield or an increase of the cost arise to make the series of steps for fabricating the wavelength conversion device less feasible.

To the contrary, with the configuration of the wavelength conversion device according to the present invention shown in FIG. 4, even if test light is input to any of the slab waveguides from one end face by mistake, an implementer can discriminate the light reflected by the grating structure by constantly monitoring the presence of the reflected light of the known wavelength. Even if the optical characteristics of a slab waveguide are measured by mistake, the implementer can immediately determine the abnormality of the measurement based on the magnitude of the amount of the reflected light detected on the input side of the test light. The wrong measurement of a slab waveguide can also be detected based on the attenuation of the component of the transmitted light of the wavelength of the reflected light on the output side.

When the wrong measurement of a slab waveguide, which should not be measured, is determined, various remedy actions can be immediately taken to remedy the error in the step of optical characteristics evaluation and waveguide selection (Step 204). For example, the three-dimensional drive mechanism of the measurement apparatus for the optical characteristics may be immediately indicated to redo the optical coupling, or an alarm may be immediately displayed. The evaluation of the optical characteristics in Step 204 is typically performed by an automated measurement system, so that various measures can be taken to remedy the detected wrong measurement. In this way, since the slab waveguides 402*a* to 402*c* have a grating structure, the reflected light can be used in case of the wrong measurement of a slab waveguide, and the measurement of the optical characteristics for selecting a desired waveguide can be efficiently performed without misalignment.

In the grating structure of the slab waveguides of the wavelength conversion device in FIG. 4, two different widths of the slab waveguide periodically occur. The grating structure reflects only a component of a particular wavelength of the input light so that the output light is attenuated at the particular wavelength. Thus, the grating structure serves as an optical filter. The grating structure is not limited to the structure in which different waveguide widths repeatedly occur in the light guide direction (z-axis direction), such as one shown in FIG. 4, but can also be implemented in various other forms. For example, the grating structure can also be implemented by, in the light guide direction (z-axis direction), periodically varying the index of refraction of the slab waveguide in the thickness direction. The variation of the index of refraction in the thickness direction may be achieved simply by a periodic variation of the thickness of the waveguide or by providing a periodic structure of a material different from that of the slab waveguide on the slab waveguide. That is, each of the plurality of slab waveguides can be formed as a waveguide on which a periodic structure of a material having an index of refraction greater than 1 is formed along the length direction of the waveguide. If the slab waveguide is a ridge waveguide, which has a core surrounded by air on the opposite sides, the implementer can easily fabricate a slab waveguide having a periodically-varying slab waveguide width by the etching for forming the nonlinear waveguides for wavelength conversion and the slab waveguides. FIG. 4 illustrates the simplest grating structure in which the width of the slab waveguide periodically varies, as an example. With the periodic grating structure described above, the index of refraction as a physical constant of the material does not vary, but the index of refraction effectively varies periodically in the length direction of the waveguide.

As described above, the wavelength conversion device according to the present invention can be implemented to include a plurality of waveguides 401*a* and 401*b* formed on a substrate of a nonlinear material and a plurality of slab waveguides 402*a* to 402*c* having a periodic structure that are arranged substantially in parallel with and spaced apart from the plurality of waveguides. The periodic structure may be a grating structure in which each of the plurality of slab waveguides has an index of refraction that periodically varies in the length direction of the waveguide.

Figure 5:
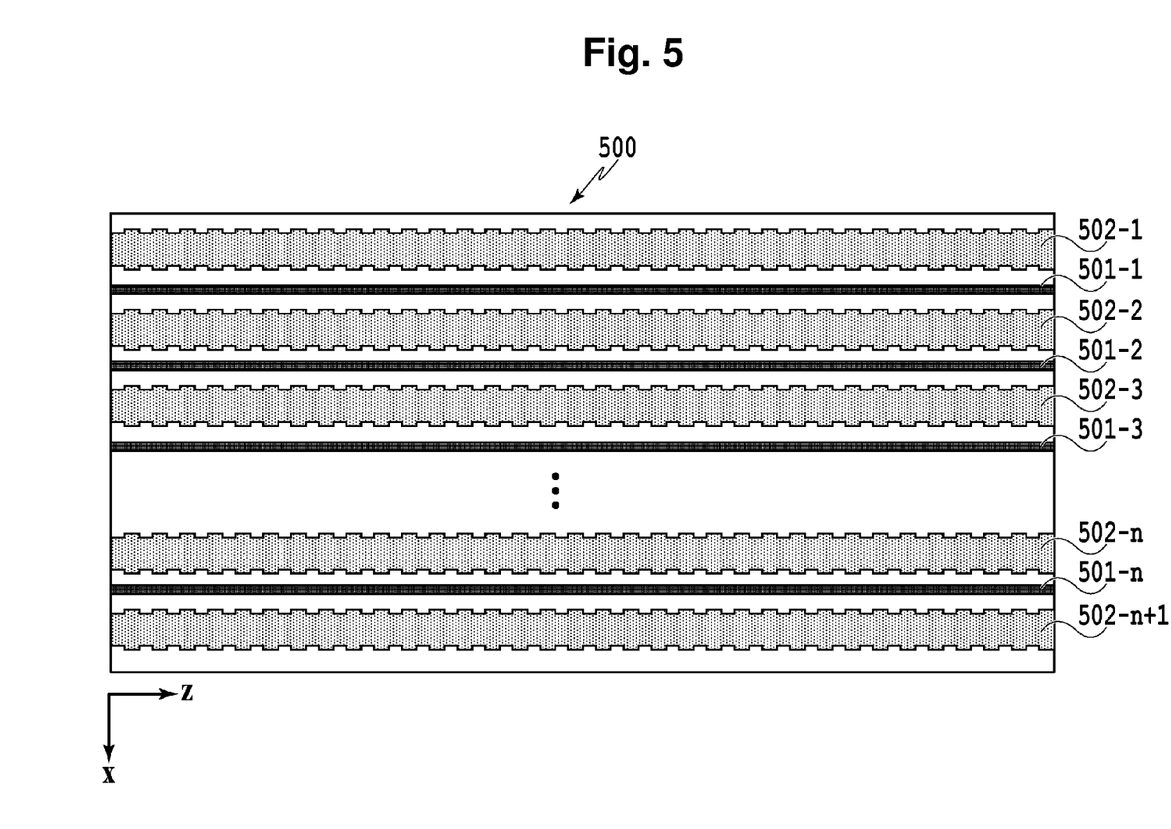
FIG. 5 is a top view showing an example of a configuration of the wavelength conversion device according to the present invention.

FIG. 5 is a top view showing an example of the configuration of the wavelength conversion device according to the present invention. FIG. 1 showing the prior art and FIG. 4 showing the present invention are given for describing a basic arrangement of the components of the wavelength conversion device and show only two nonlinear waveguides (arrayed waveguides) used for wavelength conversion. In addition, the relative sizes of the components are significantly different from those of the actual device. The top view of FIG. 5 shows an arrangement of components closer to that of the actual device, although the nonlinear waveguides, which serve as a wavelength conversion device, are still emphasized. In FIG. 5, a wavelength conversion device 500 includes n nonlinear waveguides (arrayed waveguides) 501-1 to 501-*n* used for wavelength conversion, and (n+1) slab waveguides 502-1 to 502-*n*+1 that are formed on the opposite sides of the nonlinear waveguides substantially in parallel therewith and spaced apart therefrom.

Each of the slab waveguides has a waveguide width that periodically varies, and can reflect light of a particular wavelength. That is, each slab waveguide has a grating structure in which the index of refraction periodically varies in the length direction (Z-axis) of the waveguide. The particular wavelength of the wave reflected by the grating structure can be known in advance. When evaluating the optical characteristics of the nonlinear waveguide, any wrong measurement of a slab waveguide, which should not be measured, can be determined by monitoring the presence or absence of the reflected wave of the particular wavelength, and various actions (remedy steps) can be taken to remedy an error in the step of optical characteristics evaluation and waveguide selection.

Second Embodiment

In steps for fabricating the wavelength conversion device, arrayed waveguide having cores reduced in size to increase the wavelength conversion efficiency are fabricated. At this point, slab waveguides, which are intrinsically unwanted, are formed as a result of the problems of the dry etching being solved. With the wavelength conversion device according to the first embodiment, in order to efficiently perform the step of selecting a waveguide having desired characteristics from a plurality of waveguides, the slab waveguides have a grating structure. With regard to a second embodiment, a configuration of a wavelength conversion device that allows steps (Steps 206 to 208 in FIG. 2) of mounting the wavelength conversion device in a module after selecting a desired waveguide and then performing an adjustment and an inspection of the wavelength conversion device to be more efficiently performed will be described. In addition, a method for fabricating the wavelength conversion device will also be described.

As shown in FIG. 2, in order to use the wavelength conversion device in practice, a half-finished chip of an intermediate size including a plurality of waveguides including the selected waveguide needs to be cut into a smaller chip of a final size including only the one selected waveguide that is suitable for the subsequent assembly step, and the chip needs to be packaged into a module. The optical module is implemented as an optical functional device including not only the chip including the wavelength conversion device but also a function of optical external connection by an optical fiber or the like and other associated functions as required. For example, the optical module may include a pigtail fiber connected thereto for external connection. Furthermore, in the module, one end face of the cut-out wavelength conversion device chip of the final size and an input optical fiber, and the other end face of the wavelength conversion device chip and an output optical fiber need to be optically connected. Therefore, a module assembly step (Step 206) and a step of alignment between the optical fibers and the selected waveguide (Step 207) shown in FIG. 2 need to be efficiently performed.

After the optical characteristics of the arrayed waveguides are evaluated, the chip including the selected waveguide is packaged into a module. When packaging the cut-out chip of the final size into a module, the optical fibers and the chip end faces need to be optically coupled to each other via a lens in the module. With the nonlinear waveguide made of PPLN, the size of the cross section of the core exposed on the end faces is about 5 μm by 5 μm, for example. It is more difficult to optically align and couple the optical fiber to the core via a lens than when achieving the optical coupling when evaluating the optical characteristics of the waveguides in order to select the desired waveguide. With the wavelength conversion device according to this embodiment, the slab waveguides, which would otherwise hinder the evaluation of the optical characteristics, are aggressively used for the optical alignment.

Figure 6:
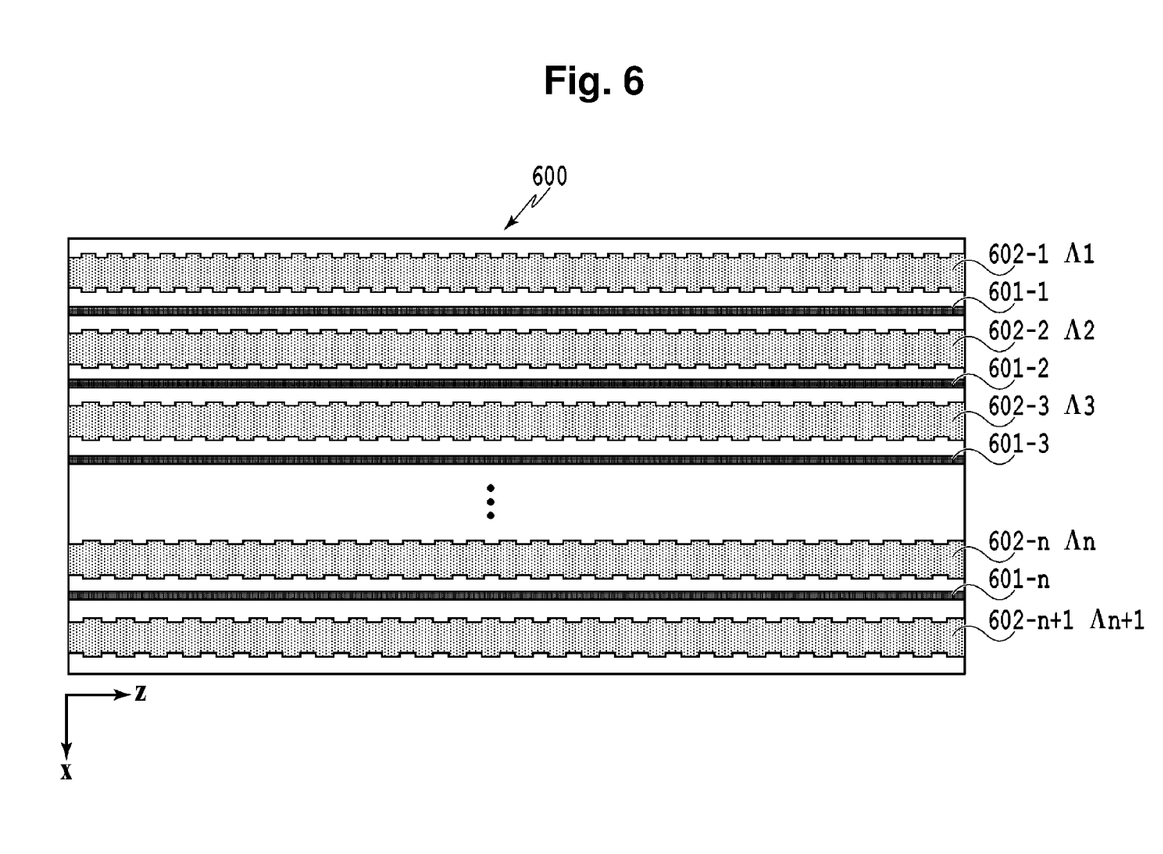
FIG. 6 is a conceptual diagram for illustrating a configuration of a wavelength conversion device according to a second embodiment of the present invention.

FIG. 6 is a conceptual diagram for illustrating a configuration of a wavelength conversion device according to the second embodiment of the present invention. FIG. 6 showing a wavelength conversion device chip 600 is a top view of the chip viewed perpendicularly to a substrate face, and the chip 600 is a chip cut out from a substrate (wafer) including a plurality of waveguides formed thereon, as with the chip 500 in FIG. 5. The chip 600 includes a plurality of waveguides 601-1 to 601-$n$ used for wavelength conversion and slab waveguides 602-1 to 602-$n$+1 having a grating structure that are formed substantially in parallel with and spaced apart from the waveguides. The grating structures of the slab waveguides have periods (repetition distances) of $\Lambda 1$ to $\Lambda n+1$, respectively, and each slab waveguide has a different reflection wavelength corresponding to the period thereof. That is, the grating structure of each of the plurality of slab waveguides has a different period and is configured to reflect light of a particular wavelength corresponding to the period thereof. In FIG. 6, from the plurality of waveguides, or specifically, from the n waveguides, one waveguide 601-$n$ shown at the bottom in the drawing has been selected as a desired waveguide. The plurality of waveguides 601-1 to 601-$n$ are nonlinear waveguides capable of wavelength conversion.

In the step of selecting a desired waveguide by successively measuring the optical characteristics of the large number of waveguides 601-1 to 601-$n$ (Step 204 in FIG. 2), there was a problem that the slab waveguides can guide the test light to a similar extent to the selected waveguide. This problem is solved by the grating structure of the slab waveguides described above with regard to the first embodiment. As described above, once one desired waveguide is selected, a more precise and difficult optical coupling of the selected waveguide needs to be performed. On the other hand, the slab waveguide, which has a larger cross section than the nonlinear waveguide, which has an extremely small core cross section, can be more easily optically coupled. It occurred to the inventors that performing a rough alignment with respect to a slab waveguide, which has a larger cross section, would help improving the precision and efficiency of the steps of module assembly and alignment. In the steps of module assembly and adjustment, the chip of the intermediate size including the selected waveguide is cut into a smaller chip (of the final chip size), which is packaged into a module. Therefore, it is also important to quickly and accurately identify which nonlinear waveguide of which chip has been selected. If the reflection wavelength(s) of the adjacent slab waveguide(s) on one or both sides of the selected nonlinear waveguide is known in advance, the position of the selected target nonlinear waveguide can be more accurately determined based on the observed reflection wavelength. That is, in the steps of module assembly and adjustment, the module can be efficiently and accurately aligned with and optically coupled to the optical fiber by aggressively using the slab waveguide(s) adjacent to the selected nonlinear waveguide.

Figure 7:
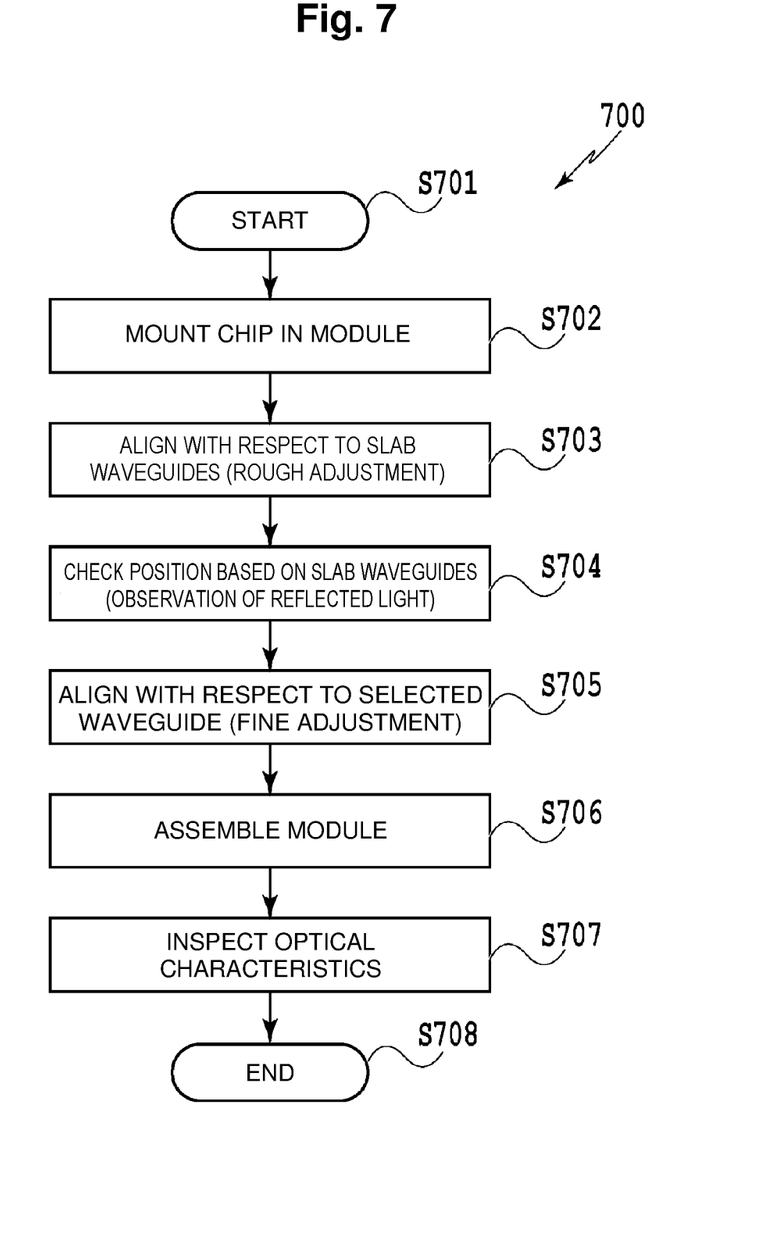
FIG. 7 is a flow diagram for illustrating a step of assembling and adjusting a wavelength conversion device module according to the present invention.

FIG. 7 is a flow diagram for illustrating steps of assembling and adjusting the wavelength conversion device module. A flow 700 in FIG. 7 corresponds to the steps 206 to 208 in the overall flow 200 of the series of steps for fabricating the wavelength conversion device in FIG. 2. The chip of the final size cut out in Step 205 in FIG. 2 is packaged into a module in Step 702 in FIG. 7, and the optical fiber is optically coupled to (aligned with) the waveguide cores on a chip end face via a lens in Steps 703 and 704.

In Step 703, a rough optical alignment is first performed with respect to the slab waveguides 602-1 to 602-$n$+1, which have a far greater core size than the nonlinear waveguides. Referring to the top view of FIG. 6 again, the slab waveguides 602-1 to 602-$n$+1 have a far greater width in the direction of arrangement of the waveguides (x-axis direction) than the nonlinear waveguides 601-1 to 601-$n$. Specifically, while the nonlinear waveguides have a core width of about 5 μm, the slab waveguides have a width of 10 to 100

µm. Therefore, the slab waveguides can be highly precisely aligned at least in the thickness direction of the substrate (y-axis direction). The rough adjustment using the slab waveguides in Step 703 can be performed by measuring the level of the transmitted light on the output side with respect to the level of the test light on the input side. Specifically, the optical coupling can be adjusted on the input side and the output side so that the level of the transmitted light is maximized. On the input side where the test light is input, the rough adjustment can be performed based on the level of the reflected wave (return light). That is, the alignment on the input side can be performed by measuring the level of the wave reflected to the test light source in the test system shown in FIG. 3. The adjustment may be performed based on the level of the transmitted test light measured with a measurement unit on the output side.

In Step 704, the implementer checks the wavelength of the reflected light from the aligned slab waveguide, and checks whether the wavelength is the reflection wavelength set for the slab waveguide(s) adjacent to the selected nonlinear waveguide. If the reflection wavelength of the grating structure of the slab waveguide is known in advance, whether the slab waveguide is a slab waveguide adjacent to the selected nonlinear waveguide can be checked by checking the measured reflection wavelength. The reflection wavelength can also be checked by directly observing the wavelength of the reflected wave on the input side. The reflection wavelength can be checked with an optical circulator that is provided on the input side and configured to receive only the reflected light component, for example. If the light receiving part is provided with an optical spectrum analyzer or wavemeter, the wavelength and intensity of the reflected light can be measured. Alternatively, a reduction of the level of the reflection wavelength may be observed with a measurement unit on the output side. If there is a plurality of slab waveguides set at different reflection wavelengths, a wide-band light source including all the reflection wavelengths needs to be used as a test light source. If the measured reflection wavelength is different from the expected wavelength, the implementer performs a movement and an alignment again while checking the reflection wavelength until the slab waveguide adjacent to the selected nonlinear waveguide is reached. If the intervals between the reflection wavelengths of the slab waveguides are known in advance, the movement can be efficiently performed.

In the flow diagram of FIG. 7, Steps 703 and 704 are illustrated as separate steps. However, the level and wavelength of the reflected wave can be observed at the same time. Therefore, these two steps can be performed substantially at the same time. If all the slab waveguides have the same reflection wavelength as in the first embodiment shown in FIG. 5, the rough adjustment with respect to the slab waveguides can be achieved based only on one of the level of the reflected wave and the level of the transmitted wave of the test light, and Step 704 can be omitted.

Once the measured reflection wavelength agrees with the expected wavelength, in Step 705, the implementer moves an adjustment position from the slab waveguide used for the rough adjustment toward the core of the selected waveguide along the x-axis. While moving the adjustment position, a finer alignment with the selected waveguide can be performed in the horizontal direction (x-axis direction) and the direction of the focal point of the lens (z-axis direction). The two-stage alignment in Steps 703 to 705 described above is just an example of the adjustment method. The present invention is not limited to the two-stage alignment, and various procedures and adjustment algorithms are possible.

The focal point adjustment (in the z-axis direction) may be performed at the stage of the rough adjustment with respect to the slab waveguides in Step 704, or adjustments in three directions may be repeatedly performed at the stage of the fine adjustment with respect to the nonlinear waveguide in Step 705.

In short, the wavelength conversion device according to the present invention can be implemented as a structure including a plurality of waveguides 501a and 501b formed on a substrate of a nonlinear material and a plurality of slab waveguides 502a to 502c having a grating period that are arranged substantially in parallel with and spaced apart from the plurality of waveguides. The grating structures of the plurality of slab waveguides have different periods and reflect light of particular wavelengths corresponding to the different periods.

Since each slab waveguide has a grating structure having a different period as described above, the optical characteristics of all the waveguides can be evaluated without error, and a desired waveguide can be selected. Furthermore, if the reflection wavelength of at least one slab waveguide adjacent to the selected waveguide is known, when packaging the chip including the selected waveguide into a module, the selected waveguide can be more easily and accurately optically aligned with the optical fiber by using the slab waveguide. The wavelength conversion device can be efficiently packaged into a module by using the slab waveguide. After Steps 703 to 705, the assembly of the module is completed in Step 706. In Step 707, a required inspection of the optical characteristics is performed via a pigtail fiber, for example, and the flow 700 of assembling and adjusting the wavelength conversion device module ends.

As shown in FIGS. 2 and 7, the present invention has an aspect as a method of fabricating a wavelength conversion device. Specifically, the present invention can be implemented as a method of fabricating a wavelength conversion device including a plurality of waveguides formed on a substrate of a nonlinear material and a plurality of slab waveguides that are arranged substantially in parallel with and spaced apart from the plurality of waveguides, the method including the series of steps described below. A first step is a step of fabricating a grating structure having an index of refraction that periodically varies in the length direction of the waveguide in each of the plurality of slab waveguides. A second step is a step (in the first embodiment) of selecting a waveguide having desired optical characteristics by detecting a reflected wave of a wavelength corresponding to the period of the grating structure and successively measuring the optical characteristics of the plurality of waveguides. A third step is a step (Steps 703 to 705) of optically coupling the selected waveguide to an optical fiber based on the reflected wave from at least the slab waveguide adjacent to the selected waveguide on one side of the selected waveguide. The step of optical coupling further includes the following two steps. A first step is a step (Steps 703 and 704) of roughly optically coupling the at least one slab waveguide adjacent to the selected waveguide to the optical fiber based on the reflected waves of the particular wavelengths corresponding to the different periods of the grating structures of the plurality of slab waveguides (in the second embodiment). A second step is a step (Step 705) of precisely optically coupling the selected waveguide to the optical fiber.

In the following, specific examples of the wavelength conversion device according to the two embodiments of the present invention described above will be described.

Example 1

Referring to FIG. 5 again, in an example of the wavelength conversion device 500 according to the first embodiment, the nonlinear waveguides 501-1 to 501-$n$ for wavelength conversion are made of a ferroelectric primarily made up of lithium niobate whose spontaneous polarization is periodically inverted. A lower substrate constituting a cladding portion is made of lithium tantalite having a coefficient of thermal expansion close to that of lithium niobate. The material forming the waveguides 501-1 to 501-$n$ is a nonlinear optical material. The material forming the substrate constituting the cladding or an over-cladding may be any material that is transparent to the light in the two wavelength bands used for wavelength conversion, such as a dielectric material or semiconductor material, such as silicon, silicon dioxide, lithium niobate, indium phosphide, or polymers, or a compound of such a dielectric material or semiconductor material and an additive. The two wavelength bands can be a band around 1550 nm and a band around 775 nm in the case of optical communication, for example.

On the supposition that the wavelength conversion device 500 in FIG. 5 is applied to the field of optical communication, such as a phase sensitive amplifier or a phase conjugate converter, the wavelength conversion device 500 is designed so that the phase matching wavelength is 1.55 μm based on the core size of the waveguides and the spatial pitch of the polarization inversion. The waveguides are straight waveguides.

The substrate made of lithium tantalite has a thickness of 500 μm. The waveguides made of lithium niobate are bonded to the substrate of lithium tantalite and then thinned to a thickness of μm by grinding and polishing. After that, the nonlinear waveguides and the slab waveguides are patterned by dry etching. In order that each slab waveguide has a grating structure whose width periodically varies, patterns are drawn in the photomask used for processing of the waveguides. The configuration of the wavelength conversion device according to the example 1 can be provided without increasing the steps of the flow of fabricating the conventional wavelength conversion device.

The reflection wavelength of the grating is expressed by the following formula (5).

$$2n\Lambda = m\lambda \quad \text{Formula (5)}$$

In this formula, n denotes an effective index of refraction, $\Lambda$ denotes a grating period, $\lambda$ denotes a reflection wavelength, and m denotes an order (integer). Typically, the simplest grating uses first-order reflected light (m=1). In this example, it is supposed that each slab waveguide has a structure in which a first width of 30 μm and a second width of 33 μm periodically occur and reflects light of a wavelength of 1.55 μm. The effective index of refraction of the slab waveguide is about 2.13, and the grating period is 0.36 μm according to the formula (5). In this example, since the first-order grating is used, a relatively small grating period of 0.36 μm is required. However, a grating of a higher order can be used when such a grating is difficult to fabricate. For example, if the order m=10, the grating length to reflect light of the same wavelength of 1.55 μm is 3.64 μm.

On the other hand, a reflectance R at the reflection wavelength of the grating is expressed by the following formula (6).

$$R = \tanh^2(\pi L \Delta n \eta / \lambda) \quad \text{Formula (6)}$$

In this formula, $\Delta n$ denotes a step of variation of the index of refraction of the grating structure, L denotes a grating length, and η denotes the ratio of propagated light contained in the core. For simplicity, it is supposed that η is 1. In this example, $\Delta n$ is about 0.00003. Although the reflectance varies with the length of the chip cut out, the reflectance is about 70% when the chip length is 2 mm, and is 90% or higher when the chip length is 3 mm, according to the formula (6). With the wavelength conversion device using the PPLN waveguide, the device typically has a length of about 30 to 50 mm. With the grating structure according to this example, a sufficient level of reflected light can be observed.

When the slab waveguide having the structure according to this example described above is fabricated, and test light is input to the slab waveguide, reflected light having a wavelength of 1.55 μm is observed. When evaluating the optical characteristics for selecting a desired nonlinear waveguide, the nonlinear waveguide to be selected and the slab waveguides can be clearly distinguished based on the presence or absence of the reflected light. Therefore, when successively evaluating the optical characteristics of a plurality of waveguides (Step 204 in FIG. 2), no misalignment occurs between one core end face and the fiber from the test light source and between the other core end face and the fiber to the measurement device. The determination of the nonlinear waveguides to be measured, the measurement of the optical characteristics thereof, and the selection of a desired waveguide can be efficiently and reliably performed.

The reflection wavelength described above can be controlled by changing the period of the grating or the size of the slab waveguide. Therefore, the reflection wavelength can be adjusted depending on the operating wavelength of the nonlinear waveguide or the wavelength range of the light source of the measurement system or the light receiving system.

Example 2

Referring to FIG. 6 again, a specific example of the wavelength conversion device 600 according to the second embodiment will be described primarily with regard to the differences from the configuration according to the example 1 shown in FIG. 5. In an example 2, the slab waveguides 602-1 to 602-$n$+1 have grating periods of $\Lambda 1$ to $\Lambda n$+1, respectively. Different reflection wavelengths are set for the plurality of slab waveguides, and if the reflection wavelengths are known in advance, the positions of the slab waveguides can be determined, and the position of the nonlinear waveguide to be selected that is adjacent to any of the slab waveguides can be determined. The reflection wavelengths $\Lambda 1$ to $\Lambda n$+1 are set approximately at regular intervals. With the wavelength conversion device 600 according to this example, each slab waveguide has a grating structure in which a first width of 30 μm and a second width of 33 μm are periodically repeated. Provided that $\Lambda 1$=0.3591 μm and $\Lambda 2$=0.3603 μm, the repetition period of the grating varies by about 1.2 nm between the slab waveguides adjacent to each other. Under this condition, the reflection wavelength of the slab waveguide 602-1 is 1530 nm, the reflection wavelength of the slab waveguide 602-2 is 1535 nm, and the reflection wavelength varies by about 5 nm between the slab waveguides adjacent to each other.

The nonlinear waveguides 601-1 to 601-$n$ for wavelength conversion are made of a ferroelectric that is a nonlinear optical material and is primarily made up of lithium niobate whose spontaneous polarization is periodically inverted. A lower substrate constituting a cladding portion is made of lithium tantalite having a coefficient of thermal expansion close to that of lithium niobate. The material forming the substrate constituting the cladding or an over-cladding may be a dielectric material or semiconductor material, such as silicon, silicon dioxide, lithium niobate, indium phosphide, or polymers, or a compound of such a dielectric material or semiconductor material and an additive. Any material that is transparent to the light in the two wavelength bands used for wavelength conversion can be used.

With the wavelength conversion device 600 in FIG. 6, again, on the supposition that the wavelength conversion device 600 is applied to the field of optical communication, such as a phase sensitive amplifier or a phase conjugate converter, the wavelength conversion device 600 is designed so that the phase matching wavelength is 1.55 µm based on the core size of the waveguides and the spatial pitch of the polarization inversion. The nonlinear waveguides 601-1 to 601-$n$ are straight waveguides.

The substrate made of lithium tantalite has a thickness of 500 µm. The waveguides made of lithium niobate is bonded to the substrate of lithium tantalite and then thinned to a thickness of 5 µm by grinding and polishing. After that, the nonlinear waveguides and the slab waveguides are patterned by dry etching.

In this example, again, when evaluating the optical characteristics, the nonlinear waveguide to be selected and the slab waveguides can be clearly distinguished by monitoring the presence of the reflected light. Therefore, when successively evaluating the optical characteristics of a plurality of waveguides (Step 204 in FIG. 2), no misalignment occurs between one core end face and the fiber from the test light source and between the other core end face and the fiber to the measurement device. The determination of the nonlinear waveguides to be measured, the measurement of the optical characteristics thereof, and the selection of a desired waveguide can be efficiently and reliably performed.

Furthermore, on the supposition that the wavelength conversion device chip 600 is packaged into a module after the desired waveguide is selected, it is confirmed that the reflection wavelength of each of the slab waveguides 602-$n$ and 602-$n$+1 on the opposite sides of the selected waveguide 601-$n$ are preset wavelengths. After the desired waveguide is selected, and the chip of the final size to be packaged into a module is cut out (Step 205), the rough adjustment using the slab waveguides (Step 703) and the observation of the reflected light (Step 704) can be performed when assembling the module. Steps 703 and 704 can be performed at the same time. When packaging the cut-out chip of the final size into a module, the optical fiber can be easily aligned with the chip end face via a lens by observing the wavelength and level of the reflected light, and the selected nonlinear waveguide can be mounted without error. Therefore, the series of steps for fabricating a wavelength conversion device shown in FIGS. 2 and 7 can be improved in terms of quality and cost.

In the examples described above, the wavelength bands around 1550 nm and 775 nm have been described as an example on the supposition that the wavelength conversion device is applied to the optical communication. However, the wavelength conversion device can also be used in other fields, such as the optical quantum information processing, and can be used with any wavelength bands.

In the embodiments and examples described above, the module of the wavelength conversion device has been described as a fiber-pigtailed module that incorporates a single cut-out chip and has only the wavelength conversion function. However, the present invention is not limited to the configuration including a single chip, and a module including two or more chips and a plurality of wavelength conversion devices forming an apparatus, such as a photosensitive amplifier or an optical transmitter, provides the same effects. Such an apparatus uses a plurality of wavelength conversion devices and needs a plurality of chips mounted in the module, and the wavelength conversion device according to the second embodiment can be used for achieving the optical coupling to the chips in the module. Therefore, the present invention also has an aspect as an optical signal processing apparatus including the wavelength conversion device according to the second embodiment.

The basic concept of the present invention is not limited to wavelength conversion devices based on the nonlinear optics, but can also be applied to cases of selecting one or more waveguides from among a plurality of waveguides in a situation where a plurality of incidental waveguides having the same optical characteristics or functions as the plurality of waveguides are formed when the plurality of waveguides are fabricated.

As described above in detail, according to the present invention, the wavelength conversion device can be efficiently manufactured at low cost.

INDUSTRIAL APPLICABILITY

The present invention can generally be applied to a communication system. In particular, the present invention can be applied to an optical communication system or an optical measurement system.

REFERENCE SIGNS LIST 100, 301, 301-1 to 301-4 wavelength conversion device chip
101$a$ to 101$b$, 302-1 to 302-$n$, 401$a$ to 401$b$, 501-1 to 501-$n$, 601-1 to 601-$n$ waveguide (nonlinear waveguide)
102$a$ to 102$c$, 402$a$ to 402$c$, 502-1 to 501-$n$+1, 602-1 to 602-$n$+1 slab waveguide
104, 404 substrate
300 wafer
303 test light source
306 measurement instrument
400, 500, 600, 700 wavelength conversion device

The invention claimed is:

1. A wavelength conversion device, comprising:
a plurality of waveguides formed on a substrate of a nonlinear material; and
a plurality of slab waveguides that are arranged substantially in parallel with and spaced apart from the plurality of waveguides, each of the plurality of slab waveguides having a grating structure in which an index of refraction periodically varies in a length direction of the slab waveguide, wherein the grating structure includes two different widths that repeatedly occur in a light guide direction.

2. The wavelength conversion device according to claim 1, wherein each of the grating structures of the plurality of slab waveguides has a different period and reflects light of a particular wavelength corresponding to the different period.

3. The wavelength conversion device according to claim 1, wherein each of the plurality of slab waveguides has a width or thickness that periodically varies in the length direction of the slab waveguide.

4. The wavelength conversion device according to claim 1, wherein each of the plurality of slab waveguides includes structures of a material having an index of refraction greater than 1 periodically arranged in the length direction of the slab waveguide.

5. The wavelength conversion device according to claim 1, wherein the plurality of waveguides and the plurality of slab waveguides are straight waveguides, and a configuration parameter that determines a size of a core of each of the plurality of waveguides gradually varies between the plurality of waveguides.

6. The wavelength conversion device according to claim 1, wherein the plurality of waveguides is made of $LiNbO_3$, or a material containing $LiNbO_3$ and at least one additive selected from among Mg, Zn, Sc, and In.

7. A method of fabricating a wavelength conversion device, the wavelength conversion device including a plurality of waveguides formed on a substrate of a nonlinear material and a plurality of slab waveguides that are arranged substantially in parallel with and spaced apart from the plurality of waveguides, the method comprising:

a step of fabricating, in each of the plurality of slab waveguides, a grating structure in which an index of refraction periodically varies in a length direction of the waveguide;

a step of selecting a waveguide having a desired optical characteristic by successively measuring an optical characteristic of the plurality of waveguides while detecting reflected wave of a wavelength corresponding to a period of the grating structure; and a step of optically coupling the selected waveguide and an optical fiber to each other based on the reflected wave from at least one slab waveguide that is adjacent to the selected waveguide on one side of the selected waveguide.

8. The method according to claim 7, wherein each of the grating structures of the plurality of slab waveguides has a different period, and the step of optical coupling comprises:

a first optical coupling step of roughly optically coupling the at least one slab waveguide adjacent to the selected waveguide and the optical fiber to each other based on reflected waves of particular wavelengths corresponding to the different periods; and a second optical coupling step of precisely optically coupling the optical fiber and the selected waveguide to each other.

* * * * *